United States Patent

Morimoto et al.

[11] Patent Number: 5,870,353
[45] Date of Patent: Feb. 9, 1999

[54] MAGNETO-OPTIC RECORDING MEDIUM, HAVING THE LANDS AND GROOVES MAGNETIZED IN ONE DIRECTION

[75] Inventors: Yasuaki Morimoto; Nobuhide Aoyama, both of Sakura, Japan

[73] Assignee: Yasuaki Morimoto, Sakura, Japan

[21] Appl. No.: 898,265

[22] Filed: Jul. 22, 1997

Related U.S. Application Data

[62] Division of Ser. No. 763,689, Dec. 11, 1996.

[30] Foreign Application Priority Data

Dec. 12, 1995 [JP] Japan ................................. 7-322896

[51] Int. Cl.$^6$ ..................................................... G11B 11/00
[52] U.S. Cl. .......................................... 369/13; 369/275.4
[58] Field of Search ........................... 369/13, 14, 275.4, 369/275.2; 360/59, 114; 365/122; 428/694 ML, 694 EC

[56] References Cited

U.S. PATENT DOCUMENTS 5,618,638  4/1997  Taki ........................................... 369/13

*Primary Examiner*—Tan Dinh
*Attorney, Agent, or Firm*—Banner & Witcoff Ltd.

[57] ABSTRACT

A high-quality magneto-optic signal is obtained by setting an optimum phase condition at the time of reproducing the land or groove record in a magneto-optic recording medium. By adjusting the angle of inclination of a wavelength plate, an optimum amount of phase compensation is provided to the land or the groove. Furthermore, the inclination of the wavelength plate is made variable, and the DC component of the magneto-optic signal is used as an adjusting signal in order to effect a phase compensation. In reproducing the signals recorded in the land and/or groove, an optimum amount of phase compensation is provided in each case, whereby a best producing condition is obtained, and high-density records can be realized.

3 Claims, 10 Drawing Sheets

MAGNETO-OPTIC RECORDING MEDIUM, HAVING THE LANDS AND GROOVES MAGNETIZED IN ONE DIRECTION

RELATED APPLICATION

This application is a division of application Ser. No. 08/763,689 filed Dec. 11, 1996 and entitled "OPTICAL INFORMATION RECORDING/REPRODUCING APPARATUS AND MAGNETO-OPTIC RECORDING MEDIUM".

BACKGROUND OF THE INVENTION

1. Technical Field To Which The Invention Belongs

The present invention relates to a magneto-optic recording medium and an optical information recording/reproducing apparatus for high density optical recording and reproducing to which the land- and/or groove-recording in a magneto-optic recording medium is applied.

2. Prior Art

At present, optical recording media are popularly used as recording media from which audio and video signals can be reproduced. In particular, magneto-optic recording media and phase change recording media are studied and developed in various places as rewritable, high-density recording media.

In order to enhance the recording intensity of an optical recording density of an optical recording medium in which information is recorded spirally or concentrically, there are considered to be two methods, i.e., the shortening of the track pitch and the enhancement of the linear recording density. In either case, the recording density of the optical recording medium can be realized by shortening the wavelength of the semiconductor laser used for recording and reproduction, but it seems to take some more time before semiconductor lasers with short wavelengths of green or blue color which can continuously oscillate at room temperature over a long time and, further, come to be sold at low prices at the market. Under such circumstances, methods are grouped according to which the recording density can be substantially improved by the use of lasers operating with presently used wavelengths, as in the case of MSR (magnetic super-resolution), in magneto-optic recording media.

In case of a RAM medium, such as a magneto-optic recording medium, light of the same wavelength is used both for the writing of information and for the reading thereof, whereas in case of a ROM medium in which information is recorded in advance, phase pits are formed by the use of a short-wavelength gas laser, i.e., Ar. In view of the ROM medium, it is true that, in case the ROM medium, the reproducing condition is the same, but recording is made therein, as it were, using, as it were, a light source which will become usable in the future; in respect of recording information at a high density, the RAM medium is disadvantageous. Due to this, in the standards for DVD which attract attention as next-generation video recording media for domestic use, no proposal has been made at present on a structure in which the recording capacity of DVD-ROM medium can be supported by a RAM medium of the same medium size.

The land and groove record can be simply doubled in its record density if the linear recording density is the same and the track pitch is the same, and therefore, the land and groove recording is a very important method in view of the development of a high-density recording medium. In this connection, it is reported that, in a magneto-optic recording medium, the MSR mentioned above can not only reduce the linear recording density, but also enhance the inter-track crosstalk, and thus the applicability thereof to the land and groove recording is examined at various places. However, the conditions for allowing a magnetic super-resolution to manifest itself-such as, e.g., the case where the reproducing laser power depends on the linear velocity, the case where a reproducing magnetic field is necessary, the case where at least three magnetic layers are necessary, etc.—are very complicated, there is an uncertainty in respect of stability, and the manufacturing costs tend to become high.

PROBLEM THAT THE INVENTION IS TO SOLVE

As a result of the narrowing of the track pitch, the problem arises that, at the time of reproduction, the data signals in the regions adjacent to the track which is being reproduced mix into the output signal, that is, a crosstalk, poses a problem. In the conventional land record or groove record, a groove or a land exists between the adjacent lands or the adjacent grooves, so that the regions in which information is written are separated from each other and thus, the occurrence of crosstalk is suppressed. However, in the case of land and groove recording, the information-recorded regions are adjacent to each other, and therefore, crosstalk exerts a very serious influence on the reproducing characteristic. In Japan Patent Application Disclosure No. 8-7357, it is stated that the crosstalk from the land or groove can be reduced by suitably selecting the depth of the groove. However, according to said Japanese Patent Application Disclosure No. 8-7357, the signal becomes free from crosstalk if the groove depth of the medium is set at about ⅙ wavelength, but, in this case, there arises the deficiency that the push-pull signal which is used as a track error signal is small. Furthermore, it is already reported that the condition for the signal to be crosstalk—free as mentioned above easily collapses, that is, the optimum groove depth changes due to the Kerr ellipticity, the focal error and the wavefront aberration of the objective lens, the ratio between the track pitch and the laser spot, etc.

Furthermore, in case of the land record or the groove record, as the track pitch is narrowed more than the existing one, the component reflected from the adjacent groove or land increase, so that a phase difference is caused, and thus, the polarized state changes, so that it becomes difficult to obtain an adequate signal.

MEANS FOR SOLVING THE PROBLEM

In order to solve the above-mentioned problem, according to the present invention, it is proposed that an optical information recording/reproducing apparatus including means for irradiating a beam to a land and /or groove on a magneto-optic recording medium to thereby record and reproduce information, said apparatus further comprising phase compensation amount adjusting means provided in a magneto-optic signal detecting optical system.

According to the present invention, it is proposed that the amount of phase compensation provided by said phase compensation amount adjusting means in the case of reproducing the land record and that in the case of reproducing the grooved record differ from each other.

According to the present invention, it is proposed that said optical information recording/reproducing apparatus comprises means which performs control so that the direction of the electric vector of the laser beam irradiated to the magneto-optic recording medium in the case of reproducing the land record and that in the case of reproducing the groove record may differ from each other.

According to the present invention, it is proposed that the electric vector of the beam irradiated to the land and the electric vector irradiated to the groove are perpendicular to each other.

According to the present invention, it is proposed that the means for controlling the direction of the electric vector is an electro-optic element.

According to the present invention, it is proposed that, as said phase compensation amount adjusting means, a wavelength plate is disposed in the magneto-optic signal detecting optical system, the inclination of said wavelength plate in the case of reproducing the land record and that in the case of reproducing the groove record differ from each other.

According to the present invention, it is proposed that, in case the beam is perpendicularly incident on said wavelength plate, said wavelength plate provides the phase difference of $(\lambda/2)n+$ approximately $\lambda/4 < P \leq (\lambda/2)n+$ approximately $\lambda/2$ (wherein n is a positive number including 0, $\lambda$ stands for the wavelength of the light source used in said optical information recording/reproducing apparatus, and P stands for the phase difference provided by said wavelength plate).

According to the present invention, it is proposed that said phase compensation amount adjusting means is an electro-optic element, which provides a phase difference upon application of an electric field thereto.

According to the present invention, it is proposed that said optical information recording/reproducing apparatus comprises means for polarization-detecting the beam irradiated to the magneto-optic recording medium and reflected thereby, a low-pass filter to which a DC magneto-optic signal being an electric differential signal between the beams which have electric vectors perpendicular to each other is fed by said polarization-detecting means, phase compensation amount adjusting means to which the variation of the DC component detected through said low-pass filter is fed as an error signal for adjusting said amount of phase compensation.

According to the present invention, it is proposed that said optical information recording/reproducing apparatus comprises means for changing the polarity of said error signal in case of reproducing the land record or in case of reproducing the groove record.

According to the present invention, it is proposed that said magneto-optic recording medium has a land record and/or a groove record and is magnetized in one direction perpendicular to the surface of a vertical recording magnetic coating of said magneto-optic recording medium.

According to the present invention, it is proposed that, in an inner circumferential portion and/or and outer circumferential portion of said magneto-optic recording medium, there is provided a region in which a signal is recorded only in the land and a region in which a signal is recorded only in the groove.

According to the present invention, it is proposed that the signals in the region in which said signals are recorded only in the land in the inner circumferential portion and/or the outer circumferential portion and the signals in the region in which said signals are recorded only in the groove in the inner circumferential portion and/or the outer circumferential portion are only DC components having the polarity opposite to the polarity of the state magnetized in one direction vertical to said magnetic coating for vertical recording.

According to the present invention, it is proposed that the optical depth of the groove of the magneto-optic recording medium for land- and groove-recording is approximately $(\lambda/4)n+\lambda/8$, wherein n stands for a positive number including 0, $\lambda$ stands for the wavelength of the light source used in said optical information recording/reproducing apparatus.

Other objects and advantages of the present invention will be made more apparent in the description which follows.

BRIEF DESCRIPTION OF THE DRAWING

There are shown in the attached drawing presently preferred embodiments of the present invention, wherein like numerals in the various views refer to like elements, and wherein.

DETAILED DESCRIPTION OF THE PRESENT INVENTION

Figure 1:
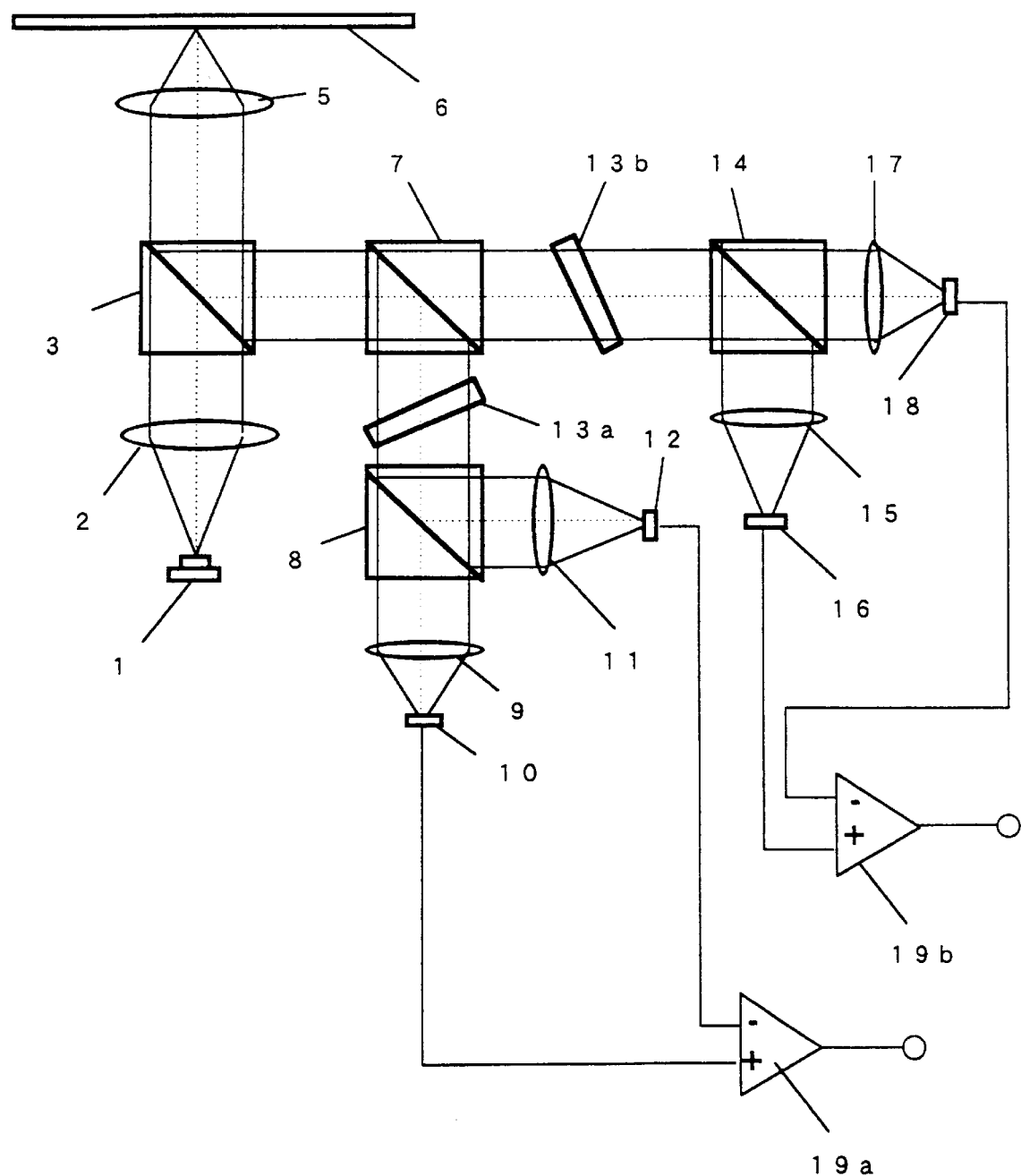
FIG. 1 is a plan view showing the constitution of the optical information recording/reproducing apparatus according to the present invention.

FIG. I is a schematic diagram showing the optical system of the optical recording/reproducing apparatus according to the present invention. The laser beam emitted from a semiconductor laser 1 which emits a beam having a wavelength of 680 nm is converted into a parallel beam by a collimeter lens 2, passes through a polarization beam splitter 3 with Tp:Rp=80:20, and Ts:Rs=2:98 and is narrowed down, by an objective lens 5 having a numerical aperture of 0.55, to the diffraction limited and irradiated to an magneto-optic recording medium 6. The beam reflected by a groove or a land is returned through the objective lens 5 again and amplitude-split by the polarization beam splitter 3 and thus separated into a transmitted component and a component reflected by the reflective surface. The component reflected is further amplitude split by a half mirror 7 into a reflected beam and a transmitted beam. The beam reflected by the half-mirror 7 is for detection of the magneto-optic signal recorded in the groove or the land; and said beam passes through a $\lambda/2$ plate 13a inclined with respect to the beam for providing an optical phase difference to thereby effect a phase compensation and then split by a polarization beam splitter 8 into a transmitted component P and a reflected component S. The component P and the component S focus on photo detectors 10 and 12 through converging lenses 9 and 11, respectively, and, after the photoelectric conversion thereof, the magneto-optic signal recorded in the groove or the land is reproduced by a differential amplifier 19a. On the other hand, the beam which has passed through the half-mirror 7 is for detection of the magneto-optic signal recorded in the land or groove and passes through a $\lambda/2$ plate 13b inclined with respect to the beam for providing an optical phase difference which is different from the phase difference provided in the case of the groove to thereby effect a phase compensation. The angle made by the electric vector of the beam incident on the $\lambda/2$ plate 13a or 13b with the crystal optic axis of the $\lambda/2$ plate 13a or 13b differs from the angle formed by the electric vector of the beam incident on the $\lambda/2$ plate 13b or 13a with the crystal optic axis of the half wave plate 13b or 13a. The beam which has passed through the half wave plate 13b is split by a polarization beam splitter 14 into a transmitted component P and a reflected component S. The component S and the component P are respectively focused by converging lenses 15 and 17 on photo detectors 16 and 18, and, after the photoelectric conversion thereof, the magneto-optic signal recorded in the land or the groove is reproduced by a differential amplifier 19b. According to the present invention, in case of reproducing the magneto-optic recording medium in which the magneto-optic signals are recorded in the land and the groove, the phase compensation amounts are fixed. Even if the phase compensation amounts are fixed, it does not matter so long as the Kerr ellipticity due to the birefringence and the Kerr ellipticity due to the magnetic coating is approximately constant in any magneto-optic recording medium.

Figure 2:
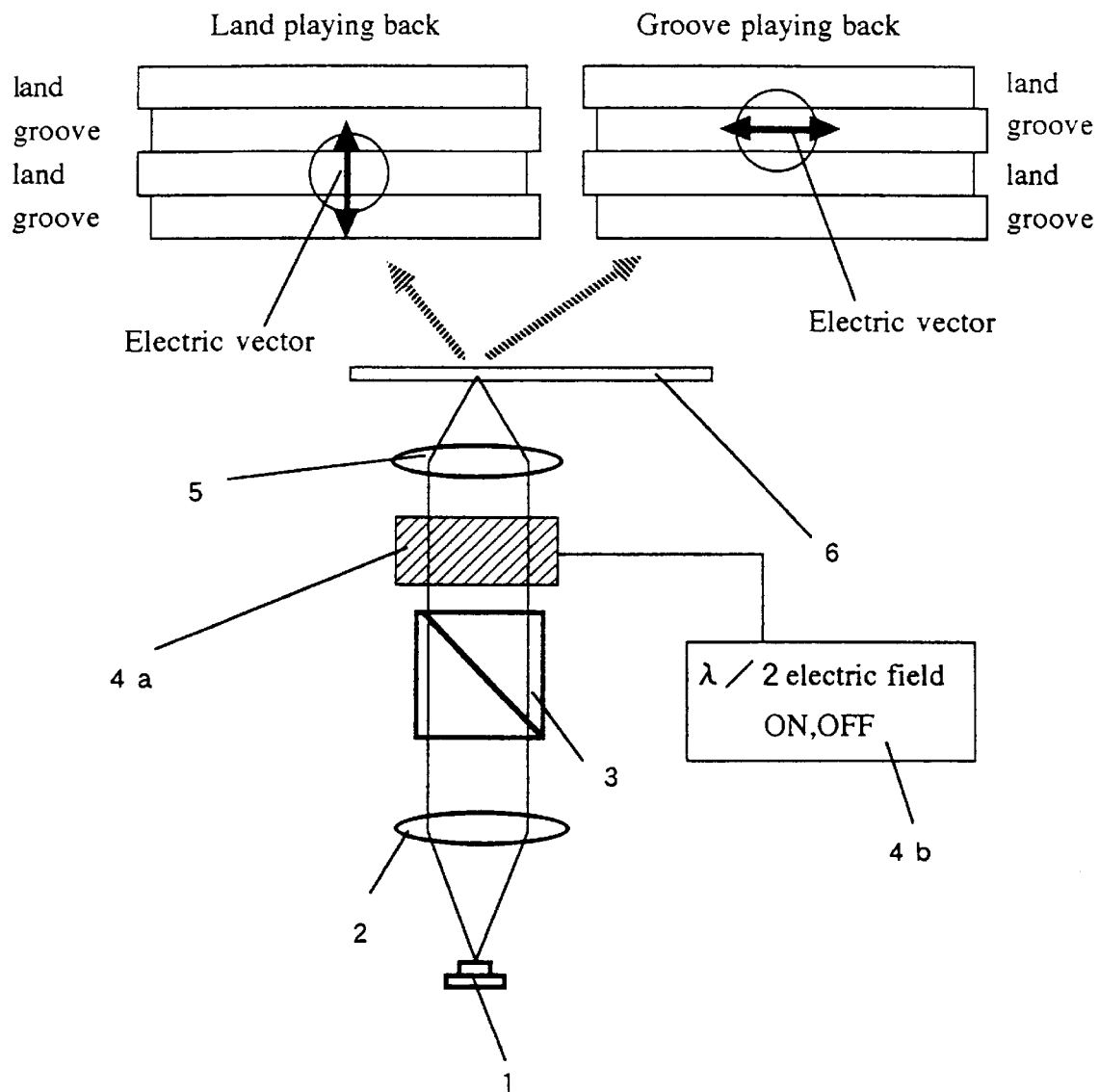
FIG. 2 is a plan view showing the constitution of the irradiating optical system for irradiation in the optical information recording/reproducing apparatus according to the present invention.

Next, in case of reproducing the land record and in case of reproducing the groove record, the reproduced signals can be improved by changing the polarization direction of the electric vector of the irradiated laser beam. Concretely speaking, in case of reproducing the land record, the beam is irradiated in a direction perpendicular to the direction in which the recorded signal flows, while, in case of reproducing the groove record, the beam is irradiated in a direction parallel to the direction in which the recorded signal flows. FIG. 2 shows the irradiating optical system and the direction of the electric vector of the laser beam irradiated to the magneto-optic recording medium 6. The beam emitted from the semiconductor laser 1 is converted by the collimeter lens 2 into a parallel beam and then passes through the polarization beam splitter 3. The polarization direction of the thus transmitted beam is controlled by an electro-optic element 4a, such as, e.g., KTP whose crystal optic axis is inclined by 22.5 degrees with respect to the electric vector of the incident beam. A driving circuit 4b feeds said electro-optic element 4a with a half wavelength voltage ( $V\lambda/2$) with which said electro-optic element 4a provides a phase difference of $\lambda/2$ with reference to the case where said $\lambda/2$ voltage is not applied. In the embodiment shown in FIG. 2, in the case of reproducing the land record, the $V\lambda/2$ voltage is applied to the electro-optic element 4a in a direction parallel to the crystal optic axis thereof, whereby the direction of the electric vector of the beam irradiated to the magneto-optic recording medium 6 is changed from the direction parallel to the direction in which the recorded signal flows to a direction perpendicular to said direction in which the recorded signal flows. In fact, the present inventor recorded random signals according to the RLL1-7 code, with the shortest mark length of 0.48 $\mu$m, in a magneto-optic recording medium in which the width of the land and the groove was 0.7 $\mu$m and the optical depth of the groove was about $\frac{1}{8}\lambda$ and reproduced said signals. In order to check the effect of the present invention, the jitter in the signal of the shortest mark length was measured in which case there was used the jitter percent obtained in such a manner that the measured value is divided by the detection window width and then multiplied by 100. The results obtained are shown in Table 1. In general, it is judged that, if the jitter percent of the signal is 12 per cent or below the signal can be sufficiently used as data, but the values obtained in the above-mentioned measurement or experiment were smaller than 12 per cent as is clear from said Table 1. In particular, in case of reproducing the land record, the best result was obtained when the laser beam was irradiated so that the electric vector thereof may be perpendicular to the direction in which the recorded signal flows, and, in case of reproducing the groove record, the best result was obtained when the laser beam was irradiated so that the electric vector may become parallel to the direction in which the recorded signal flows.

TABLE 1

|  | Land | Groove |
| --- | --- | --- |
| Parallel | 9.0% | 7.8% |
| Perpendicular | 7.5% | 9.2% |

In case of recording signals in the land and the groove and reproducing them therefrom, the practically useful results that the jitter per cent was smaller than 12 per cent was obtained in either case without regard to the polarization of the laser beam irradiated, but, if, in case of reproducing the land record, the laser beam is irradiated so that the electric vector thereof may become perpendicular to the direction in which the signal flows, while, in case of reproducing the groove record the laser beam is irradiated so that the electric vector thereof may become parallel to the direction in which the signal flows, then the quality of the reproduced signal can be further improved, and a reproducing operation suited for a further high-density recording can be performed.

Figure 3:
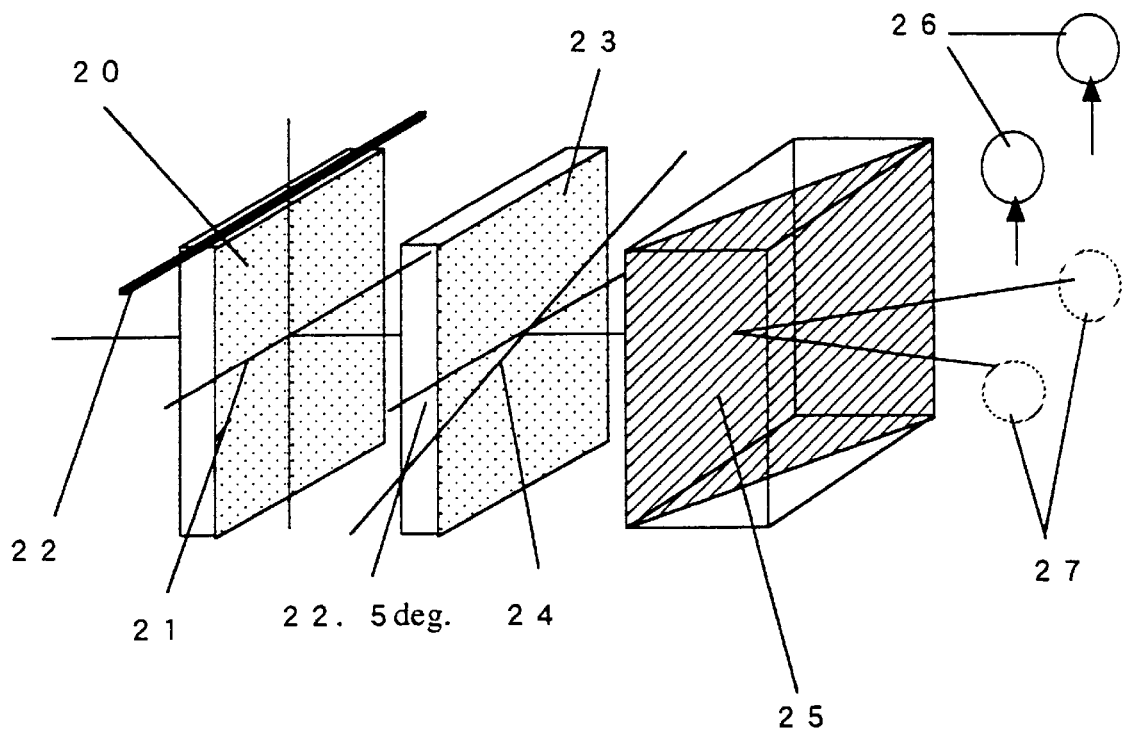
FIG. 3 is a perspective view explaining the principle of providing a phase difference in the optical information recording/reproducing apparatus according to the present invention.

Next, the method for electrically adjusting the amount of phase compensation according to the present invention will be described below. FIG. 3 shows the magneto-optic signal detecting optical system through which the laser beam passes after being reflected by the polarization beam splitter 3.

Figure 4:
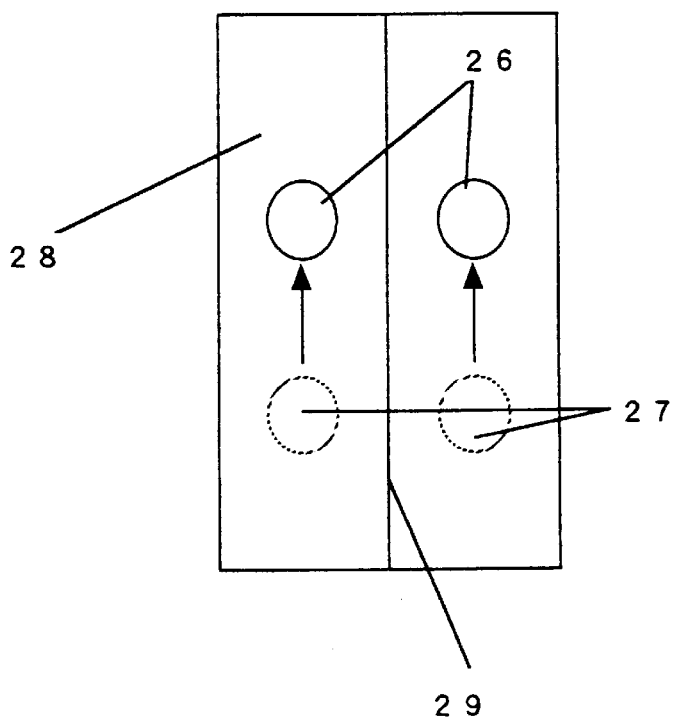
FIG. 4 is a plan view explaining the relationship between the beam and the photo detector for detection of the magneto-optic signal which is used in the optical information recording/reproducing apparatus according to the present invention.

The component reflected by the polarization beam splitter 3 shown in FIG. 1 is incident on a wavelength plate 20 which is inclinable with respect to the beam in order to provide a phase difference for effecting a phase compensation. According to the present invention, the inclination of the wavelength plate 20 is changed using a rotating shaft 22 as the axis of rotation, so that the distance over which the beam passes through the wavelength plate 20 is changed, whereby the amount of phase compensation is adjusted. Here, a crystal optic axis 21 of the wavelength plate 20 is parallel to the direction of the electric vector of the incident beam no Kerr effect is present. Furthermore, the beam which has passed through the wavelength plate 20 is incident on a $\lambda/2$ plate 23. The crystal optic axis 24 of the $\lambda/2$ plate 23 is disposed so as to form an angle of 22.5 degrees or 67.5 degrees with the direction of the electric vector of the incident beam in case no Kerr effect is present. Furthermore, the beam which has passed through the $\lambda/2$ plate 23 is split by a Wollaston prism 25 into components whose electric vectors are perpendicular to each other. The respective components mentioned above are focused on a halved photo detector, and, after photoelectric conversion thereof, the magneto-optic signals recorded in the land and/or the groove are reproduced by means of a differential amplifier. Here, the phase difference provided by the wavelength plate 20 is set at a value smaller than ½ of the used laser wavelength in case the beam is perpendicularly incident. However, by changing the angle of inclination of the wavelength plate 20, the distance over which the beam passes through the wavelength plate 20 is changed, so that the phase difference changes from a value smaller than the half wavelength to a value larger than one wavelength. That is, the phase difference is set so as to include a half-wavelength difference without fail. FIG. 4 shows the movement-caused by the change in the angle of inclination of the wavelength plate 20—on a photo detector 28, of beams 26 and 27 being the components resulting from the splitting of the reflected beam by the Wollaston prism 25, the electric vectors of said components being perpendicular to each other. The respective beams are photoelectrically converted by the dedicated segments divided by a dark line 29.

Figure 5:
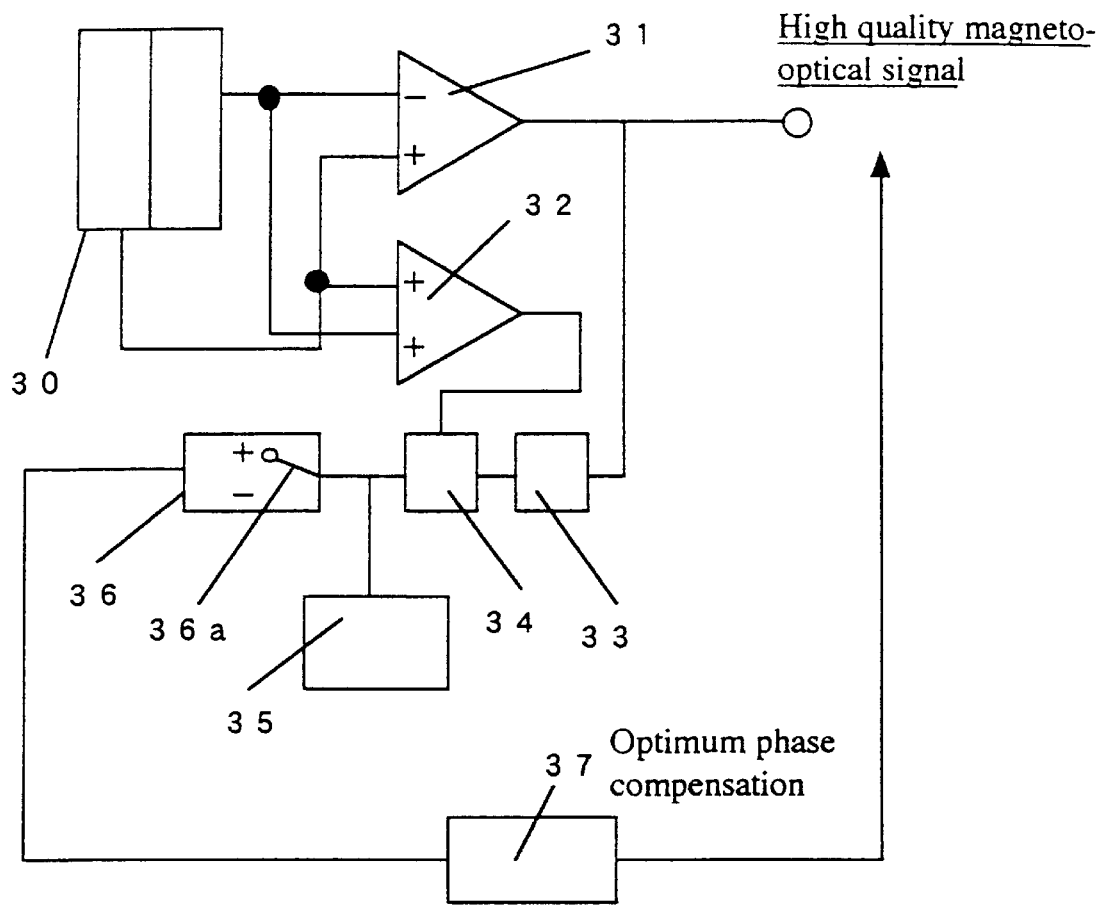
FIG. 5 is a block diagram showing the constitution of the feedback circuit for performing a dynamic phase compensation in the optical information recording/reproducing apparatus according to the present invention.

Next, FIG. 5 is a block diagram explaining the operation principles of the present invention. The two beams which have resulted form the splitting of the reflected beam by the Wollaston prism and whose electric vectors are perpendicular to each other are photoelectrically converted by a halved photo detector 30 and differentially outputted through a differential amplifier 31 and thus detected as a magneto-optic signal. On the other hand, the thus outputted differential signal is passed through a low-pass filter 33 without removing the DC component, and further, a sum signal of the outputs from the halved photo detector 30 is formed by a summing amplifier 32, and, by an auto-gain control circuit 34 using said signal as a reference, the unnecessary DC variation due to the variation in reflection ratio and the like is suppressed, and thus, the variation of the DC component in the differential output which variation depends on the amount of phase compensation is detected. Next, in order to correct the non-uniformity in light intensity of the two beams incident on the halved photo detector 30 and the gain error of the amplifier, an offset adjustment is performed by use of a DC level adjusting circuit 35. Offset adjustment is necessary only in the manufacturing stage but, thereafter, not necessary any more.

Figure 6:
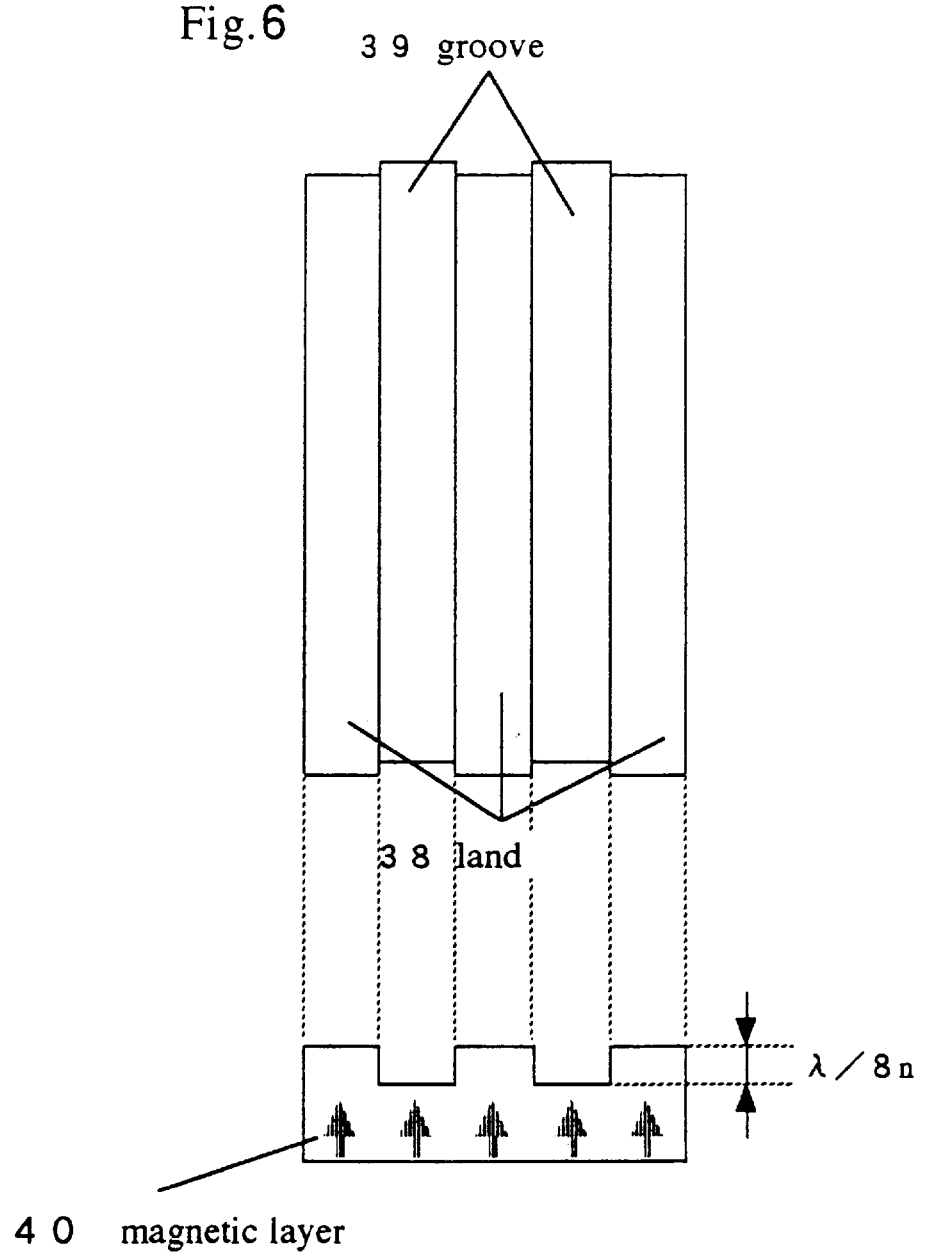
FIG. 6 is a plan view showing the state in which the magneto-optic recording medium according to the present invention is erased.

Furthermore, by a negative feedback servo circuit 36, the current for driving the wavelength plate 20 whose angle of inclination is variable as shown in FIG. 3 is fed to a voice coil 37, whereby the angle of reflection of the wavelength plate 20 is changed, and thus, the angle of incidence of the beam incident on the wavelength plate 20 is changed, whereby phase compensation can be realized. Thus, eventually, an optimum phase compensation is always effected, and a high quality magneto-optic signal is obtained. In order to give a further detailed description on the above-mentioned principle of phase compensation, the change in noise level and carrier level when the amount of phase compensation was changed was measured. In the below described measurement, all the amounts of phase compensation referred to were measured by assuming the half-wave as zero in the phase difference caused by the wavelength plate 20. On a polycarbonate substrate in which the depth of the groove was 53 nm and the optical depth thereof was approximately ⅛ wavelength, and the width of the land and the groove was approximately 0.7 $\mu$m, an SiN film was formed to a thickness of 90 nm by the use of the sputtering method The formation of all the films referred to from now on was carried out by the use of the sputtering method. Next, a TbFeCo film 22 nm in thickness for use as a recording layer was formed, an SiN film 22 nm in thickness was formed, and an Al film for use as a reflector film was formed to as a thickness of 70 nm. Furthermore, as a protective coating, as a UV resin was spin coated to as a thickness of about 13 $\mu$m. The recording linear velocity was 4.5 m/s, the mark length was 0.65 $\mu$m. The recording method employed was the magnetic field modulation method, the recording power laser was 5 mW, the reproducing laser power was 1 mW. According to the present invention, the whole surface of the recording medium was magnetized in one direction perpendicular to the surface of the magnetic film for vertical magnetic recording as shown in FIG. 6. A magnetic layer 40 at as a position corresponding to as a land 38 and as a groove 39 is magnetized in the same direction as said one direction. In case of recording as a signal into the land or groove with the whole surface magnetized in one direction in advance, one of them, i.e., the land or the groove remains in the state magnetized in one direction, so that, if the amount of phase compensation is changed, the polarized state sharply changes. It is because the laser beam irradiated to the magneto-optic recording medium in which as a signal recording was made in, e.g., the land is reproduced, is not only applied to the land but also stretch over the groove, and therefore, the influence exerted on the polarized state of the reflected beam from the magneto-optic recording medium is very large as compared with the case where the magnetic polarity of the groove is uneven.

Figure 7:
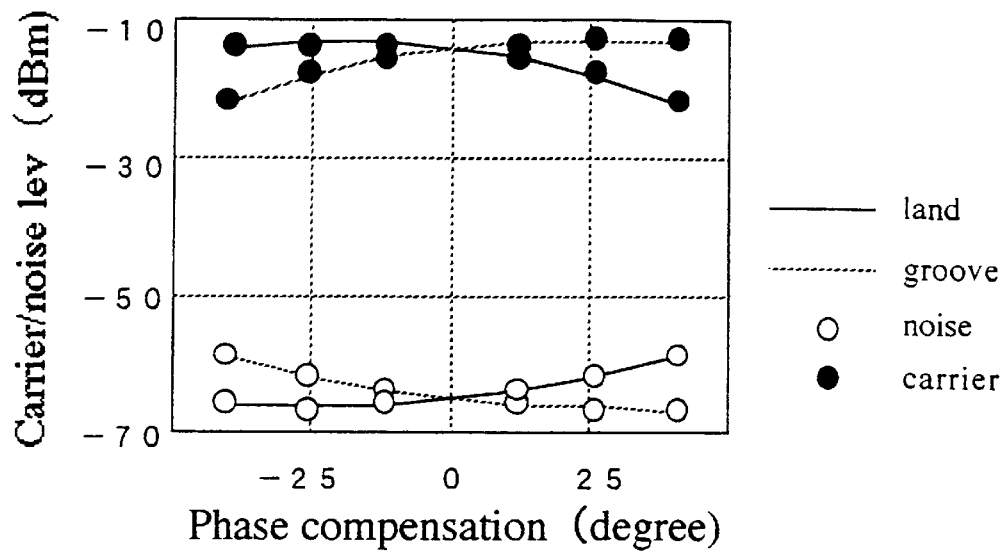
FIG. 7 is a schematic diagram showing the result of the measurement made of the dependency of the carrier level and the noise level on the phase compensation amount.
Figure 8:
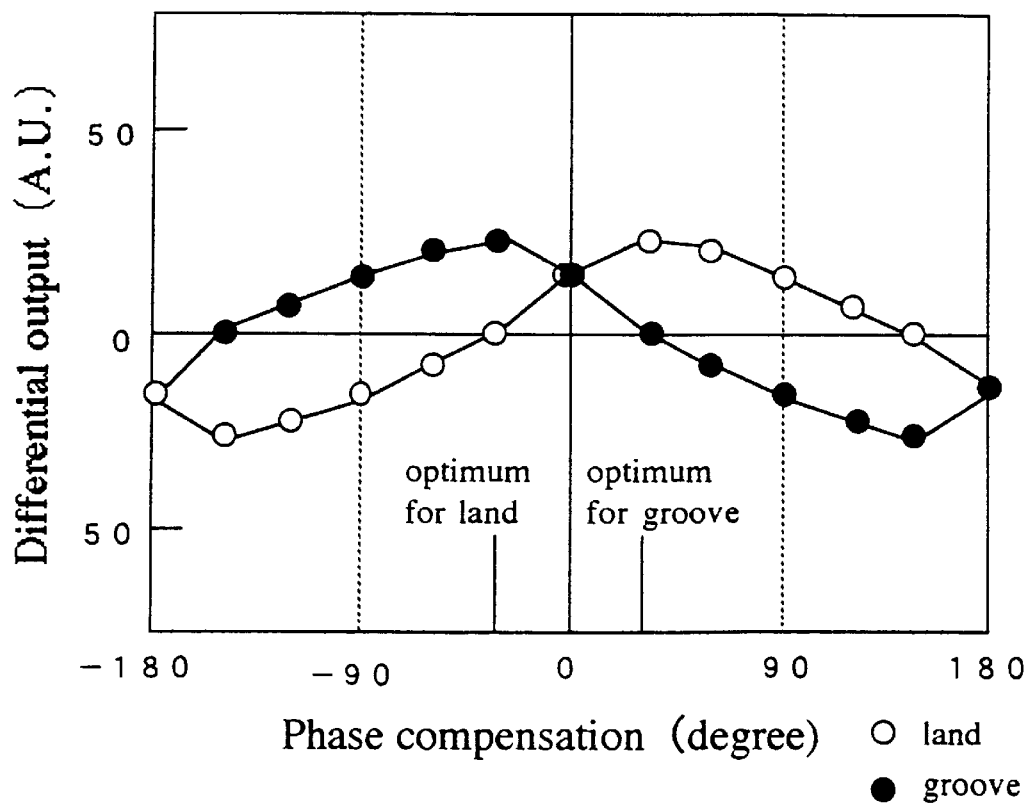
FIG. 8 is a schematic diagram showing the result of the measurement made on the dependency of the DC component of the differential output, which is a magneto-optic signal, on the phase compensation amount.

Referring to FIG. 7, the solid lines in the graph shown pertain to the case where information is recorded into the land and reproduced therefrom, while the dotted lines pertain to the case where information is recorded in the groove and reproduced therefrom. As is apparent from FIG. 7, if the noise level rises, the carrier level reduces, and further, symmetrical results were obtained in the land and the groove with respect to the change in the amount of phase compensation. Furthermore, the amount of phase compensation which provides the lowest noise level and the amount of phase compensation which provides the highest carrier level coincide with each other both in the case of the land and in the case of the groove, and in the case of the groove. The amount of phase compensation required therefor was about −30 degrees in case of the land and about 30 degrees in the case of the groove. These amounts of phase compensation depend on the ratio between the laser spot irradiated onto the magneto-optic recording medium and the track pitch. In case the track pitch is further narrowed, the amount of phase compensation must be further increased, but, if the wavelength plate 20 shown in FIG. 3 is such as a wavelength plate as gives $(\lambda/2)n+$ approximately $\lambda/4 < P \leq (\lambda/2)$ and approximately $\lambda/2$ (wherein n stands for a positive number including 0, and P stands for the phase difference in case the beam is perpendicularly incident on the wavelength plate 20 shown in FIG. 4) then it is possible to adjust any phase compensation amount with the phase difference of $(\lambda/2)(n+1)$ as the reference value that is zero, by the inclination of the wavelength plate 20. That is, the phase difference provided by the wavelength plate 20 is suitably selected from the above-mentioned condition in accordance with the ratio between the spot size of the laser irradiated onto the magneto-optic recording medium and the track pitch. That is, the phase compensation amount required can be provided by adjustment at any track pitch or at any spot size. Here, it is important why the noise level is changed by the change in the phase compensation amount. If the recording noise caused by the magnetic domains is predominant, the change in the noise level must behave in the same manner as the change in the carrier level. It is because both changes are due to the shape of the recording magnetic domains and Kerr angle of rotation. The largest noise among the other noises is the amplitude modulation noise due to the quality of the substrate. The amplitude modulation noise is sharply or keenly caused by the imbalance between the two signals inputted to the differential amplifier 31 shown in FIG. 5. That is, depending on the phase differential amount, the DC component of the differential output changes to the minus or the plus side. FIG. 8 shows the dependency of the DC component of the differential output on the phase compensation amount. In case the phase compensation amount is zero, the change in the DC component is plus both in the land and the groove, and in the land and groove curves symmetrical to each other with respect to the zero axis of phase compensation are detected. Therefore, in the negative feedback servo circuit 36 for phase compensation as shown in FIG. 5, there is provided a switch 36a for inverting the polarity of differential output from the differential amplifier 31 which output stands for an error signal is inverted in the case of the land and in the case of the groove, whereby the system can be applied to either the land record or the groove record. Whether the polarity of the differential output is plus or minus with the zero phase compensation amount depends on the external magnetic field and the polarity of the differential amplifier 31 when the magneto-optic recording medium is initially bulk erased.

Figure 9:
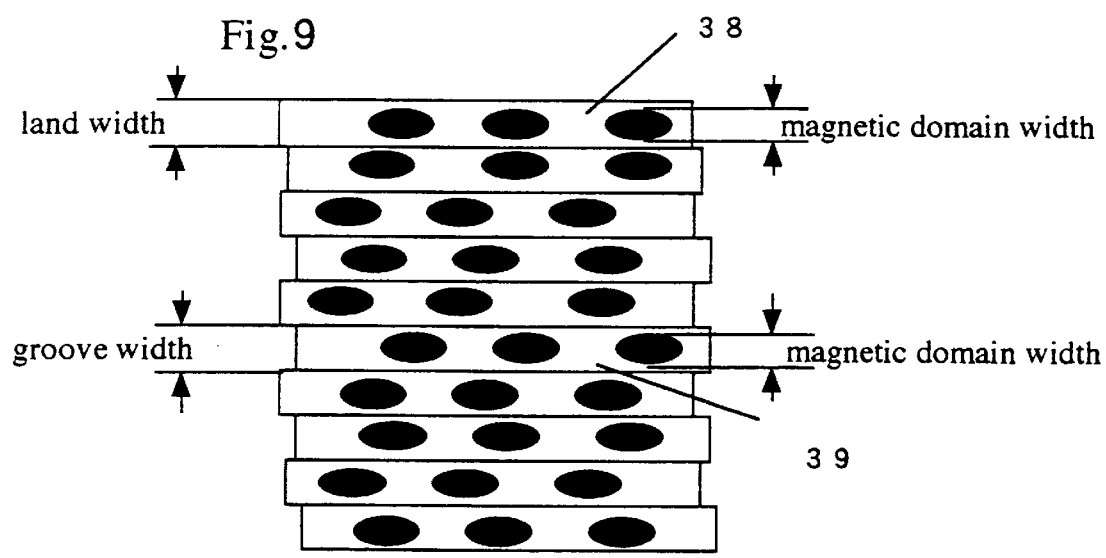
FIG. 9 is a plan view showing the width of the recording marks in the land and groove portions.
Figure 10:
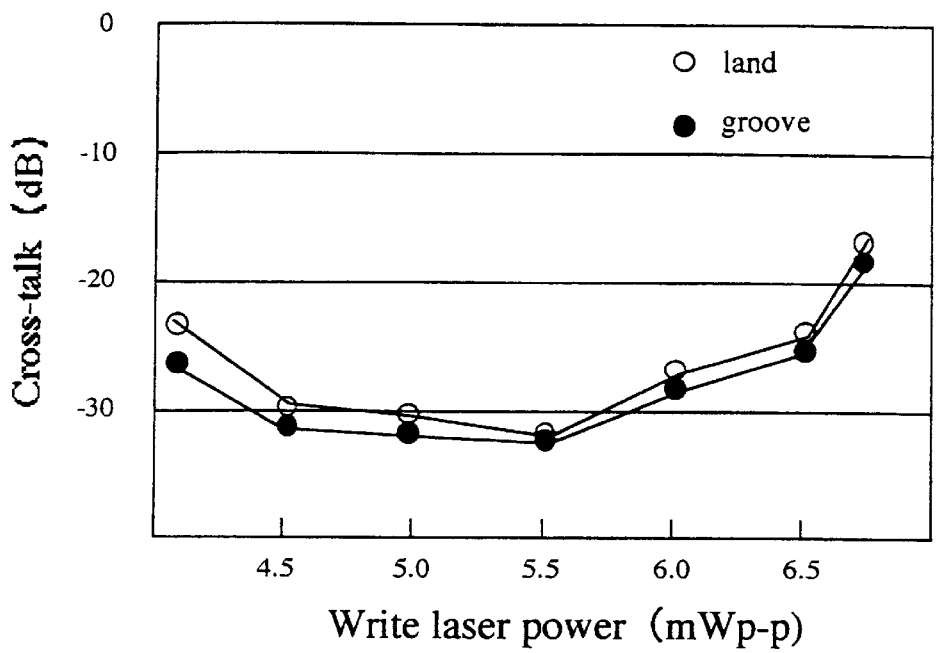
FIG. 10 is a schematic diagram showing the result of the examination made, by the use of the optical information recording/reproducing apparatus according to the present invention, concerning the dependency on the recording laser power of the inter-track crosstalk in the land and groove records by the use of the optical information recording/reproducing apparatus according to the present invention.

By using the optical information recording/reproducing apparatus according to the present invention as mentioned above, phase compensation is performed when the land record or the groove record is reproduced, whereby the minimum noise level and the maximum carrier level can be obtained, and therefore, it is always possible to detect a high-quality magneto-optic signal. From now on, as the track pitch is more and more narrowed, the optical information recording/reproducing apparatus according to the present invention becomes more and more important The case where, by the use of the optical information recording/reproducing apparatus with the phase compensation function according to the present invention, the land and the groove record was reproduced will be described below. The medium used for the measurement was the magneto-optic recording medium referred to in the foregoing description. As shown in FIG. 6, the whole recording surface was magnetized in one direction perpendicular to the magnetic coating for perpendicular recording of the magneto-optic recording medium and thereafter, magneto-optic signals are recorded in the land portion and the groove portion. In the embodiment of the present invention, the pulse-assist magnetic field modulation system was used in which optical pulses with a pulse duty ratio of 37% synchronized with the clock are irradiated and an alternating magnetic field subjected to an RLL1-7 code modulation was applied. The reproducing laser power was 1.0 mW. Information was recorded in the land portion or the groove portion by the use of magnetic domains of 2 $\mu$M, and the value obtained by subtracting the carrier level when the signal recorded in the land portion or the groove portion was directly reproduced was subtracted, from the carrier level in the unrecorded land portion or groove portion was defined as the crosstalk. Here, in case of the land and groove record, the error signal for phase compensation adjustment reduces as compared with the case of the land record or groove record. It is because, in the case of the land or groove record, the groove or land is in a state magnetized in one direction perpendicular to the magnetic coating without fail, so that the plane of polarization sharply changes in response to the change in the phase compensation amount. On the other hand, in the case of the land and groove record, signals are recorded in the mutually adjacent land and groove, so that, in the magnetic coating before recording, there are two states in magnetizing direction perpendicular to the magnetic coating before recording; and thus, the polarity of the error signal changes. Thus, if signals narrower than the respective track widths of the land 38 and the groove 39 are recorded as shown in FIG. 9, the initial magnetized state exists near the border between the land and the groove, so that one polarity can be maintained, and thus, the error signal with a sufficient amplitude is obtained. FIG. 10 shows the result of the dependency of the crosstalk on the laser power. The crosstalk from the signal recorded in the land portion or the groove portion lies below 30 dB over a wide laser power range. Here, according to the present invention, in case, in a magneto-optic recording medium in which the groove has an optical depth of about ⅛ wavelength, the land record or the groove record is reproduced, the phase compensation amount with which the crosstalk becomes the minimum and the phase compensation with which the carrier level becomes the maximum coincide with each other. In addition, ⅜, ⅝, and ⅞ wavelength following approximately $(\lambda/4)n+\lambda/8$ are also good and the same results are obtained because the phase difference between the land and groove results in the phase difference of ¼ wavelength as an absolute value due to the one wavelength period. That is, to couple with the matter described in connection with FIG. 7, the phase compensation amount which provides the maximum carrier level, the minimum noise level, and the minimum crosstalk is identical in the reproduction of the land record or in the reproduction of the groove record.

Figure 11:
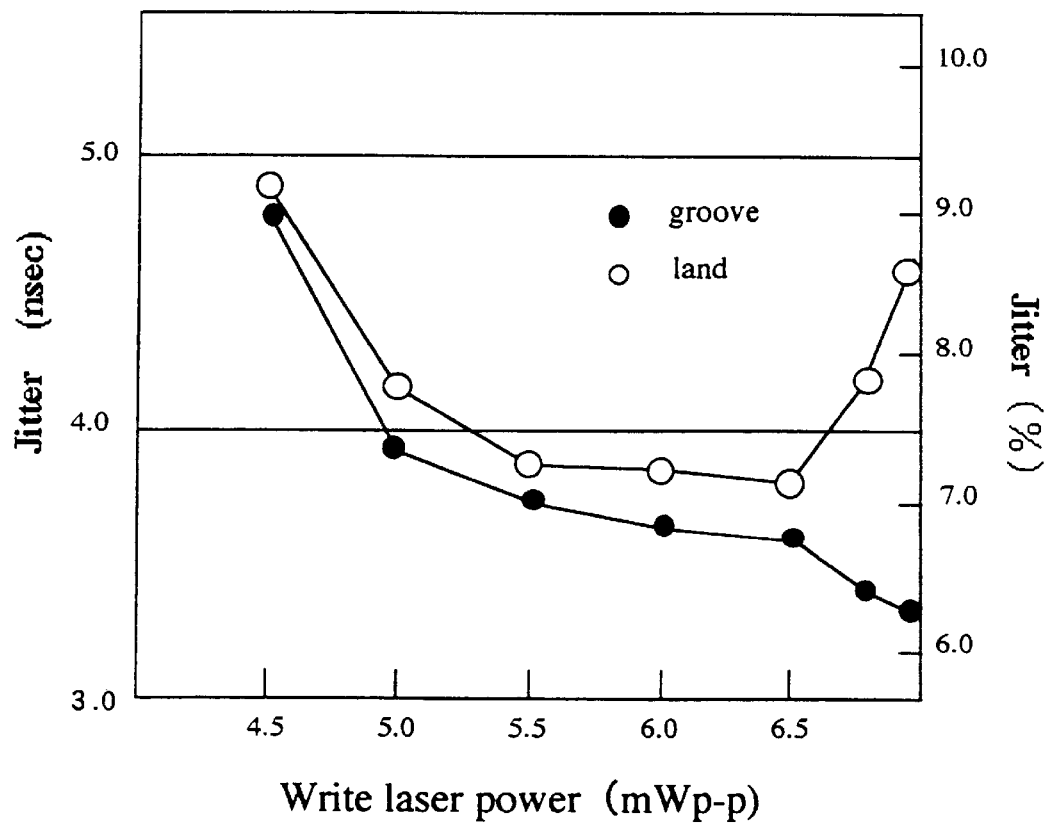
FIG. 11 is a schematic diagram showing the result of the examination made, by the use of the optical information recording/reproducing apparatus according to the present invention, concerning the dependency of the jitter on the recording laser power in the case both the land and groove records are reproduced by the use of the optical information recording/reproducing apparatus according to the present invention.

Next, shown in FIG. 11 is the jitter characteristic obtained when the record is reproduced under the condition that the length of 2T being the smallest mark length in the RLL1-7-code is 0.49 $\mu$M, and the line speed is 4.5 m/s. Signals are recorded in both the land portion and the groove portion (the recording being made first into the land portion), and then, the thus recorded signals recorded in the land and groove portions are reproduced, whereby it is found that the jitter can secure so large a margin that the jitter is smaller than 9% over a wide laser power range. Here, the jitter is expressed by the value obtained by multiplying, by 100, the ratio of the standard deviation σ2T to the window width (time); ordinarily it is judged that, if the jitter is less than 12 per cent, it is a level that can be sufficiently used for data. Further, in case a conventional optical recording/reproducing apparatus is used, it was impossible to achieve a jitter which is less than 12% in case no phase compensation is provided for the signal reproduction respectively in the land portion and the groove portion. Since the optical depth of the groove in the magneto-optic recording medium used here is approximately ⅛ wavelength, the phase compensation amount for obtaining the maximum carrier level in the reproduced track and the phase compensation amount for producing the minimum crosstalk from the adjacent tracks coincide with each other. However, the phase compensation amount in the case of the land and that in the case of groove differ from each other. In particular, in case the birefringence and the Kerr ellipticity can be ignored, the phase compensation amounts for the land and the groove are identical in absolute value but different in polarity. As described above, in case the optical depth of the groove is ⅛, ⅜, ⅝ and ⅞, if, by utilizing the polarity of the DC component of the magneto-optic signal, the phase is always compensated so as to bring said DC component to zero, then there can be realized the reproducing condition that the crosstalk when the land and groove records are reproduced is the minimum, the noise level is the minimum, and the carrier level is the maximum. Furthermore so long as, in the actual magneto-optic recording medium, a polycarbonate substrate is used, a phase change due to the birefringence and the Kerr ellipse appears without fail, which causes some problem or other. However, if the magneto-optic recording apparatus with a phase compensation function according to the present invention is used, the substrate can be treated in the manner as the glass substrate. It is because the influence by the birefringence and the Kerr ellipse appears in a very simple form of whether the phase compensation amount shifts to the plus side or the minus side as a whole, so that, by the phase compensation function, the phase compensation amount is automatically adjusted in accordance with the individual magneto-optic recording medium.

Figure 12:
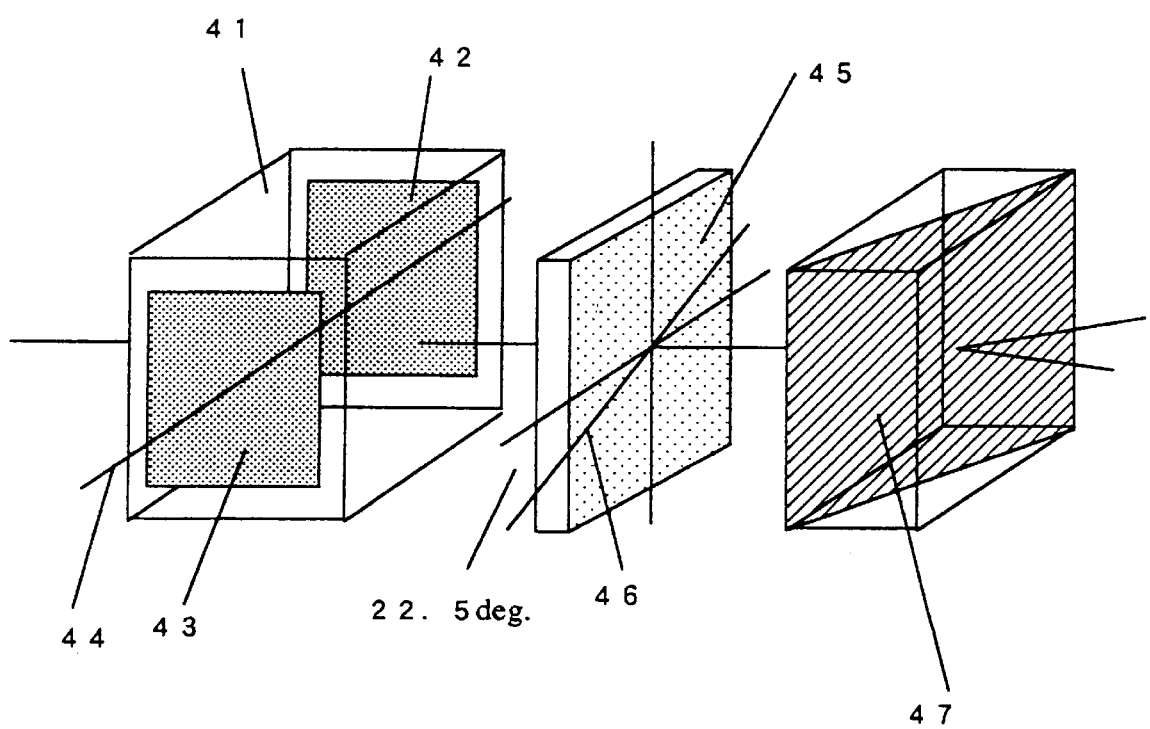
FIG. 12 is a perspective view explaining the principle of providing a phase difference according to the optical information recording/reproducing apparatus according to the present invention.

FIG. 12 is a schematic diagram for explaining a further embodiment of the present invention. In the optical information reproducing/recording apparatus mentioned above, phase compensation is performed by the use of the inclination-angle-variable wavelength plate 20 for performing a dynamic phase compensation as shown in FIG. 3, but, according to this embodiment, phase compensation is realized by the use of an electro-optic element 41 instead of the inclination-angle-variable wavelength plate 20 as shown in FIG. 12. The beam led into the magneto-optic signal detecting optical system by the polarization beam splitter 3 shown in FIG. 1 is incident on the electro-optic element 41 such as a KTP which produces a phase difference by the action of an electric field. Here, the crystal optic axis 44 of the electro-optic element 41 is disposed so as to be parallel to the direction of the electric vector of the incident beam. Furthermore, the beam which has passed through the electro-optic element 41 is incident on a λ/2 plate 45. Here, the crystal optical axis of the λ/2 plate 45 is disposed so as to form an angle of 22.5 degrees or 67.5 degrees with the direction of the electric vector of the incident beam in case no Kerr effect exists. Furthermore, the beam which has thus passed through the λ/2 plate 45 is split by a Wollaston prism 47 into two beams having electric vectors perpendicular to each other. An electric field is applied in a direction parallel to the crystal optic axis 44. The voltage for the generation of said electric field is fed between the electrodes 42 and 43 in accordance with the phase compensating error signal based on the differential signal obtained from the two beams separated by the Wollaston prism 47. By using the electro-optic element 47 as stated above, exactly the same phase compensation function can be obtained. And thus, in both the land record and the groove record, optimum reproducing conditions can always be realized.

Figure 13:
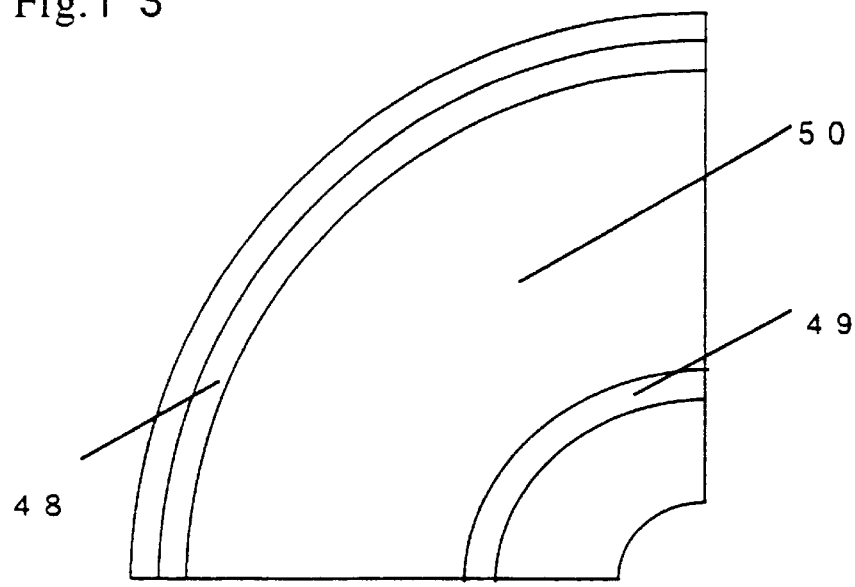
FIG. 13 is a plan view showing the regions in which signals are recorded in only the land or only the groove in the outer circumferential portion and the inner circumferential portion of a quadrantal portion of the magneto-optic recording medium.
Figures 14A, 14B:
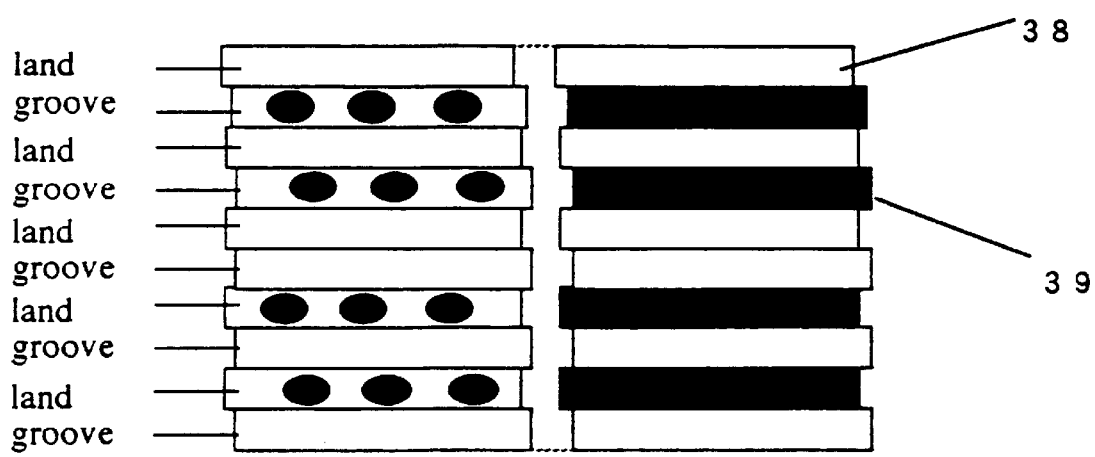
FIG. 14 is an enlarged view showing the region in which signal is recorded in only the land or the groove.

Next, an embodiment of the magneto-optic recording medium according to the present invention will be described below. If the birefrigence of the substrate of the magneto-optic recording and or the characteristic of the Kerr ellipse based on the magnetic coating are approximately uniform throughout the whole surface of the medium, it is not necessary to perform a dynamic phase compensation, that is, even if the respective characteristic of each magneto-optic recording medium differs, it has only to determine the phase compensation amount necessary for the magneto-optic recording medium if the characteristic is approximately the same throughout the whole surface of the medium. Thus, as shown in FIG. 13, a plurality of tracks in which a magneto-optic signal is recorded in only the land and a plurality of tracks in which a magneto-optic signal is recorded in only the groove are provided in partial regions of an outer circumferential portion 48 and an inner circumferential portion 49. Of course, as a matter of fact, it suffices if only one of the outer circumferential 15 and the inner circumferential portion 16 is provided. Furthermore, FIG. 14 is an enlarged view showing how the magneto-optic signals are recorded in both the land and the groove. FIG. 14A shows that the track in which a magneto-optic signal with a certain mark length is recorded only in a land 38 and a track in which a similar magneto-optic signal is recorded only in a groove 39 are disposed in a state separated from each other by a pair of land and groove in which no magneto-optic signal is recorded. FIG. 14B shows the case where only the DC component is used instead of marks. In this case, no mark is present in the land 38 and the groove 39, and they are magnetized in directions different in polarity. As shown in FIG. 14 magneto-optic signals are previously recorded in the inner circumferential portion and/or the outer circumferential portion, whereby it is possible to detect the optimum phase compensation amount in the case of reproducing the magneto-optic signals recorded in the land and/or groove in the data area. It is because the land record and/or groove record in the outer circumferential portion 48 and/or the inner circumferential portion 49 are reproduced to thereby feed a current to a voice coil for inclining the wavelength plate 20 shown in FIG. 3, in which case the current value or the voltage value when the phase compensating error signal becomes zero, is stored in a RAM with reference to the land and/or groove. When the land record and/or the groove record in the data area are reproduced, the current value or the voltage value is derived from the RAM, so that on the basis of the thus derived value, a voltage is produced by the driving circuit, and a current is fed into the voice coil, whereby the wavelength plate 20 can be adjusted to an optimum inclination. Of course, in the case of using conventional magnetic coatings such as, e.g., TbFeCo or the multi-layer magnetic coating—a magnetic super-resolution coating—of the RAD, FAD, or CAD system. Furthermore, a similar effect can be obtained. Furthermore, in the case of magneto-optic recording medium in the light intensity modulation type LIM-DOW system or method, likewise, an optimum reproducing condition can be obtained.

As described in detail above, according to the optical information recording/reproducing apparatus with a phase compensation function according to the present invention, it is ensured that, in case of reproducing the land or groove record, the lowest noise level can always be maintained, while the highest carrier level can always be maintained. Furthermore, particularly, if the optical depth of the groove in groove recording magneto-optic recording medium is ⅛, ⅜, ⅝ and ⅞ (wavelength), then as for the marks recorded in each of the land and the groove, a stable reproduction can always be realized with an optimum condition. That is, the crosstalk from the adjacent land or groove can be minimized, the noise level can be minimized, and the carrier level can be maximized. From now on, the further improvement in recording line density and in track density must unavoidably be made, so that, by the use of the optical information recording/reproducing apparatus according to the present invention which can provide an optimum reproducing condition, the jitter margin can be substantially improved without being subjected to a restriction pertaining to the wavelengths of semiconductor lasers; and thus, the present invention can greatly contribute in connection with high—density recording.

I claim:

1. A magneto-optic recording medium previously magnetized in one direction perpendicular to the surface of a vertical recording coating, characterized in that said magneto-optic recording medium has a land record and a groove record and that the optical depth of the groove is approximately $(\lambda/4)n+\lambda/8$ so that the signal level of magneto-optic signal on said land and groove becomes approximately maximum, and the noise level becomes approximately minimum, and the crosstalk by signal recorded on the groove (or land) adjacent to the land (or groove) under reproduction becomes minimum, wherein n stands for a positive number including 0, $\lambda$ stands for the wavelength of the light source used for information recording and reproducing.

2. A magneto-optic recording medium according to claim 1, wherein at least one of the inner circumferential portion and the outer circumferential portion of said magneto-optic recording medium, there is provided a region in which a signal is recorded only in the groove and a region in which a signal is recorded only in the land so that the DC level of the magneto-optic signal is detected and the optimum condition for reproducing signals recorded in the land and the groove is obtained previously.

3. A magneto-optic recording medium according to claim 2 wherein the signals in the region in which said signals are recorded only in the land in at least one of the inner circumferential portion and the outer circumferential portion and the signals in the region in which said signals are recorded only in the groove in at least one of the inner circumferential portion and the outer circumferential portion are only DC components having polarity opposite to the polarity of the state magnetized in one direction vertical to said magnetic coating for vertical recording.

* * * * *